C. HARRISON, W. BATE & W. G. PERKS.
RECOVERING VOLATILE LIQUIDS.
APPLICATION FILED SEPT. 13, 1907.
1,022,416.
Patented Apr. 9, 1912.
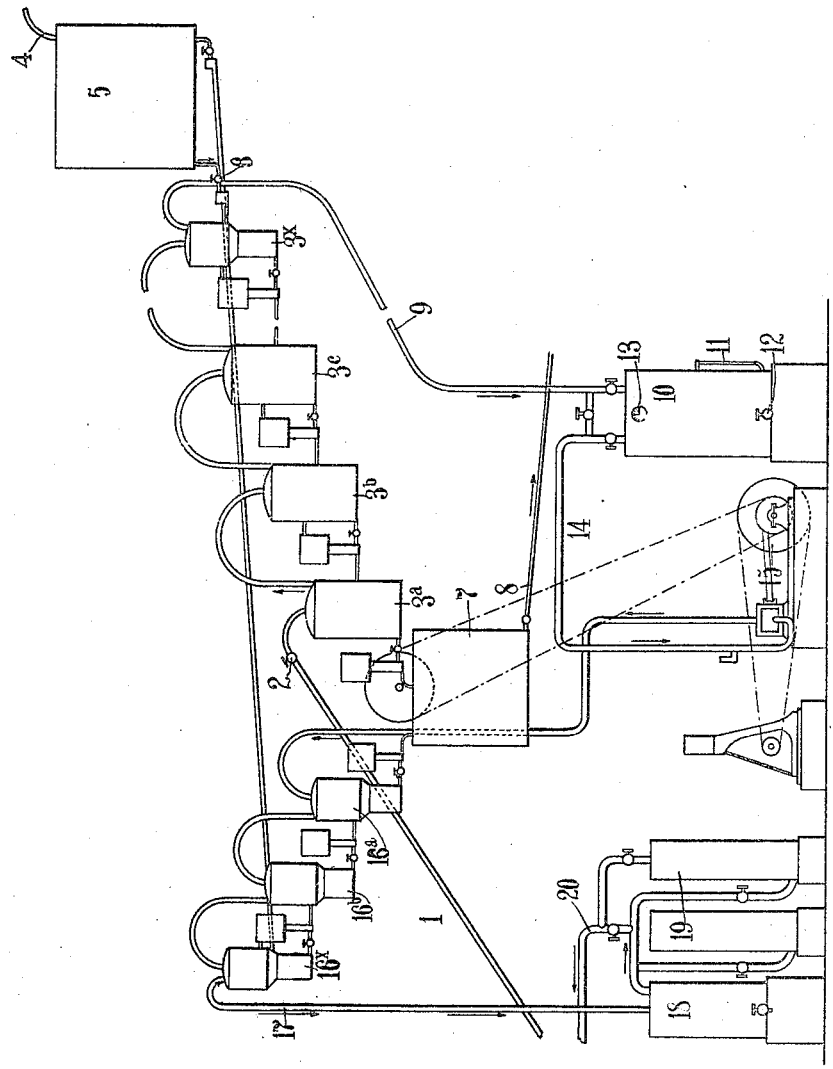

UNITED STATES PATENT OFFICE.

CHARLES HARRISON, WILLIAM BATE, AND WALTER G. PERKS, OF HAYLE, ENGLAND.

RECOVERING VOLATILE LIQUIDS.

1,022,416.

Specification of Letters Patent.     Patented Apr. 9, 1912.

Application filed September 19, 1907. Serial No. 392,718.

*To all whom it may concern:*

Be it known that we, CHARLES HARRISON, WILLIAM BATE, and WALTER GEORGE PERKS, subjects of the King of Great Britain, residing at Hayle, in the county of Cornwall, England, have invented new and useful Improvements in Recovering Volatile Liquids, of which the following is a specification.

This invention relates to an improved process for the recovery of volatile liquids such as acetone or alcohol from substances with which they have been used as a solvent, such for instance as cordite.

An apparatus suitable for use in carrying out the process is illustrated diagrammatically in the accompanying drawing.

In this apparatus the absorbers consist of a series of receptacles through which the effluent gases containing volatile vapor are drawn or forced and which are supplied with a suitable absorbent liquid. In the case of acetone vapors we find that the most suitable liquid for the purpose is a solution of chlorid of calcium of about 40° Twaddell or 1.20 sp. gr. This liquid is placed in a suitable tank from which it is arranged to flow into the receptacle farthest removed from the gas inlet pipe. The receptacles which are preferably of the construction known as Wolff's bottles are arranged stepwise so that the chlorid of calcium solution flows from the farthest or uppermost bottle progressively downward toward the gas inlet and the gas travels in the reverse direction upward through the series of bottles. In this manner the bottle containing the richest solution of acetone in chlorid of calcium solution is that nearest the gas inlet and from it the gas passes successively into less and less charged receptacles until at the final bottle the last traces of volatile vapor come in contact with fresh liquid. As in the process of absorption the volume of the gas is continuously diminished the capacity of the bottles should diminish in like proportion. The gas circulation is maintained by means of a small air pump or in any other convenient manner and by means of suitable valves the balance is maintained between the liquid and the gas pressure in each respective bottle so that there is no possibility of the liquid being sucked back through the gas pipes or the flow of the gas being stopped by the pressure of the liquid.

The result of the absorption process as above set forth is to provide a liquid solution of chlorid of calcium rich in acetone or alcohol. From this solution the volatile liquid is recovered by distillation at a temperature above 100 degrees centigrade and the solution of calcium chlorid may after cooling be used over again.

We do not limit ourselves to the use of chlorid of calcium solution for dissolving the volatile vapor. The use of the inorganic salt being merely for the purpose of facilitating the separation of the volatile liquid from the water during the distillation, we may equally well absorb the volatile liquid in water and subsequently add the inorganic salt to the solution before distillation. The practical advantage of using the above specified solution of chlorid of calcium for this purpose lies in the cheapness of the material and the fact that the solution is unimpaired by the process of recovery of the acetone or alcohol and when brought to the proper strength can be forthwith used over again for the recovery of fresh quantities of acetone or alcohol.

Referring in detail to the drawing; the vapors from the drying stoves arrive by the pipe 1 and pass through a valve 2 into the lowest of the saturators. These vessels marked respectively $3^a \ldots 3^x$ are connected in series and formed preferably of progressively diminishing capacity as already explained. The vapors escaping from the last saturator $3^x$ are drawn through the pipe 9 into the tank 10. This tank is provided with a gage glass 11, discharge cock 12 and manometer 13; in it any liquid passing over will collect and can be periodically removed. The remaining vapor and gases are drawn out of the tank 10 through the pipe 14 by the pump or aspirator 15 and pass up into a second set of saturators if necessary $16^a$–$16^x$ where they are again brought into contact with absorbent liquid, flowing downward into the tank 7. From the uppermost saturator the gases pass through the pipe 17 into the collecting chamber 18, then through drying chambers 19 and back to the stoves through the pipe 20.

The absorbent liquid is delivered from a storage cistern (not shown) through the pipe 4 into the cistern 5 from which it flows through 6 into the uppermost saturator $3^x$ thence into the next and so on, descending at last into the collecting tank 7, from which vessel it is run off through the pipe 8 to the column still or other device for separating the volatile from the absorbent liquid.

What we claim is:

1. A process for the recovery of small percentages of vapor of volatile liquid diffused through a large bulk of air, which comprises causing the air current to pass upward through a series of separate and independent saturators, through which a chemically indifferent liquid descends from one to another in a continuous undisturbed flow, whereby the volatile vapor is diffused through the absorbent liquid, and finally recovering the dissolved volatile liquid therefrom by distillation.

2. A process for the recovery of acetone vapor from moist cordite which consists in drying it in a current of air, passing the air in an ascending current through saturators through which a solution of chlorid of calcium flows downward, distilling off the absorbed acetone from the chlorid of calcium solution, and returning the said solution after distillation to the uppermost saturator for use over again.

In witness whereof we have signed our names to this specification in the presence of two subscribing witnesses.

CHARLES HARRISON.
WILLIAM BATE.
WALTER G. PERKS.

Witnesses to the signatures of Charles Harrison and William Bate:
HOWARD FOX,
WILLIAM H. DANIELL.

Witnesses to the signature of Walter George Perks:
LEONARD E. HAYNES,
FREDK. L. RAND.